(12) United States Patent
Hirano

(10) Patent No.: US 7,729,319 B2
(45) Date of Patent: Jun. 1, 2010

(54) RADIO LAN SYSTEM AND RADIO LAN SYSTEM SIGNAL COLLISION EVADING METHOD

(75) Inventor: Jun Hirano, Yokosuka (JP)

(73) Assignee: Panasonic Corporation, Osaka (JP)

( * ) Notice: Subject to any disclaimer, the term of this patent is extended or adjusted under 35 U.S.C. 154(b) by 1944 days.

(21) Appl. No.: 10/275,437

(22) PCT Filed: Mar. 6, 2002

(86) PCT No.: PCT/JP02/02067

§ 371 (c)(1),
(2), (4) Date: Sep. 4, 2003

(87) PCT Pub. No.: WO02/073895

PCT Pub. Date: Sep. 19, 2002

(65) Prior Publication Data

US 2004/0044784 A1    Mar. 4, 2004

(30) Foreign Application Priority Data

Mar. 6, 2001    (JP) .............................. 2001-062709

(51) Int. Cl.
*H04W 4/00*     (2009.01)
*H04L 12/28*    (2006.01)
*H04L 12/413*   (2006.01)
*H04L 12/46*    (2006.01)

(52) U.S. Cl. ...................... 370/336; 370/338; 370/345; 370/395.4; 370/442; 370/445

(58) Field of Classification Search ................. 370/229, 370/230, 235, 252, 336, 338, 345, 395.4, 370/442, 445
See application file for complete search history.

(56) References Cited

U.S. PATENT DOCUMENTS 5,303,230 A * 4/1994 Hishida et al. .............. 370/458

(Continued)

FOREIGN PATENT DOCUMENTS

JP    59183552    10/1984

(Continued)

OTHER PUBLICATIONS

T. Tokuyasu, et al.; "Fair bandwidth sharing schemes for AWA with IEEE 802.11 systems on same frequency channel," Proceedings of the 2000 IEICE General Conference, The institute f Electronics, information and communication engineers, Mar. 28-31, 2000, B-5-131, p. 516.

(Continued)

*Primary Examiner*—Alpus H Hsu
(74) *Attorney, Agent, or Firm*—Dickinson Wright PLLC

(57) ABSTRACT

The present invention discloses a wireless LAN system and a signal collision avoidance method for the wireless LAN system, which can avoid the collision of signals between a wireless LAN system initiating communication at fixed intervals and a wireless LAN system initiating communication after waiting for the vacancy of a channel. According to the present invention, when it is recognized that there is a no signal section between a downlink phase and an uplink phase upon scheduling of a communication frame, a scheduler part 6 performs scheduling for putting a NAV setup signal, which covers the no signal section, behind the downlink phase in accordance with instructions from a NAV setup signal generating part 8, and transmits the same. It can prevent any station in an IEEE802.11a wireless LAN system from transmitting data in the no signal section, and hence avoid the collision of signals within the period of the uplink phase.

19 Claims, 9 Drawing Sheets

U.S. PATENT DOCUMENTS

| | | | | |
|---|---|---|---|---|
| 5,517,504 | A * | 5/1996 | Tran et al. | 370/347 |
| 5,583,866 | A * | 12/1996 | Vook et al. | 370/312 |
| 5,615,215 | A * | 3/1997 | Utting et al. | 370/337 |
| 5,734,867 | A * | 3/1998 | Clanton et al. | 370/461 |
| 6,181,683 | B1 * | 1/2001 | Chevillat et al. | 370/329 |
| 6,317,854 | B1 * | 11/2001 | Watanabe | 714/749 |
| 6,665,536 | B1 * | 12/2003 | Mahany | 455/432.1 |
| 7,046,650 | B2 * | 5/2006 | Sherman | 370/338 |
| 7,050,452 | B2 * | 5/2006 | Sugar et al. | 370/465 |
| 7,164,671 | B2 * | 1/2007 | del Prado et al. | 370/338 |
| 7,167,484 | B2 * | 1/2007 | Liang et al. | 370/445 |
| 7,177,294 | B2 * | 2/2007 | Chen et al. | 370/338 |
| 2002/0075835 | A1 * | 6/2002 | Krishnakumar et al. | 370/338 |
| 2002/0093929 | A1 * | 7/2002 | Mangold et al. | 370/336 |
| 2002/0122468 | A1 * | 9/2002 | Belkerdid | 375/146 |
| 2003/0063619 | A1 * | 4/2003 | Montano et al. | 370/443 |
| 2003/0067872 | A1 * | 4/2003 | Harrell et al. | 370/229 |

FOREIGN PATENT DOCUMENTS

| | | |
|---|---|---|
| JP | 05260051 | 10/1993 |
| JP | 11331927 | 11/1999 |
| JP | 2000196597 | 7/2000 |
| JP | 2001274805 | 10/2001 |

OTHER PUBLICATIONS

English translation of T. Tokuyasu, et al.; "Fair bandwidth sharing schemes for AWA with IEEE 802.11 systems on same frequency channel," Proceedings of the 2000 IEICE General Conference, The institute of Electronics, information and communication engineers, Mar. 28-31, 2000, B-5-131, p. 516.

* cited by examiner

RADIO LAN SYSTEM AND RADIO LAN SYSTEM SIGNAL COLLISION EVADING METHOD

TECHNICAL FIELD

The present invention relates to a wireless LAN system and a signal collision avoidance method for the same, which avoid the collision of signals between two or more wireless LAN systems different in communication protocol from each other.

PRIOR ART

In the technical field of conventional wireless LAN communications, ARIB-MMAC-HiSWANa has been defined in which control information, downlink data, and uplink data are arranged sequentially in time sequence in a frame with a fixed cycle time implement communications between radio stations. Another standard substantially compatible with ARIB-MMAC-HiSWANa has been defined in Europe as ESTI-BRAN-HiperLAN/2. HiSWANa and HiperLAN/2 (ARIB-MMAC-HiSWANa and ESTI-BRAN-HiperLAN/2 standards) use OFDM (Orthogonal Frequency Division Multiplexing) for communication in a frequency band of 5 GHz. HiSWANa and HiperLAN/2 define a transmission frame with a frame cycle of 2 msec. In the transmission frame, as shown in FIG. 18, a broadcast channel (BCH), a frame channel (FCH), an access feedback channel (ACH), downlink/uplink phases (DL, UL), composed of long/short transport channels (LCH, SCH), a random channel (RCH), and unused areas are arranged sequentially in time sequence.

In the downlink phase, data is transmitted from an access point (a base station device in a HiSWANa or HiperLAN/2 wireless LAN system) to a plurality of mobile terminals or a single mobile terminal. In the uplink phase, data is transmitted from a mobile terminal to the access point. The access point schedules the arrangement of a transmission frame and notifies the mobile terminal of the scheduled transmission frame.

On the other hand, IEEE802.11a has been defined in the USA as a wireless LAN standard. IEEE802.11a also uses OFDM for communication in the 5 GHz frequency band, but CSMA (Carrier Sense Multiple Access) is used as its access method. In the CSMA method, a station (a terminal device in an IEEE802.11a wireless LAN system) detects the presence or absence of a vacant channel prior to transmitting data, and when a vacant channel exists, the station transmits data, while when no vacant channel exists, the station waits for proper time and retries transmission.

IEEE802.11a defines Network Allocation Vector (hereinbelow called NAV) for control of transmission between stations regardless of carrier sense as one of the measures mainly against hidden terminal problems (when two terminals are so far away that they cannot communicate with each other, one is called a hidden terminal as seen from the other). Once the NAV is set, the station will postpone the transmission of signals during the set period.

As shown in FIG. 18, HiSWANa and HiperLAN/2 prescribe some intervals from when the access point transmits the access feedback channel (ACH) until the mobile terminal initiates transmission in the uplink phase (Prescribed Time 1, Prescribed Time 2, . . . , Prescribed Time n). These intervals are defined in consideration of the fact that mobile terminals vary in response speed due to differences in performance; they make it possible to adapt the transmission to respective response speeds.

The access point sets a prescribed time for each mobile terminal according to the response speed of the mobile terminal so that any data block will not be placed earlier than allowable response time. As a result, a small amount of traffic causes areas without data to be allocated, that is, no signal sections, between a data block in the downlink phase and a data block in the uplink phase, and between data blocks in uplink phases different in prescribed time.

Since the above-mentioned HiSWANa and HiperLAN/2 standards use the same frequency and modulation method for communication as those in the IEEE802.11a standard, if these systems coexist so close that one is affected by waves from the other, the collision of signals between the systems may occur. This causes a problem of making it difficult to use mixed wireless LAN systems based on these different standards.

In other words, HiSWANa and HiperLAN/2 initiate communication at fixed intervals, while IEEE802.11a initiates communication after waiting until a channel becomes vacant. Therefore, if a period during which data has not been allocated in the HiSWANa or HiperLAN/2 system exceeds a waiting-time period until a station that operates according to the IEEE802.11a standard detects a vacant channel, the station will initiate transmission. In this case, data transmitted in the following uplink phase collides with an IEEE802.11a frame transmitted from the station.

The carrier sense (detection of a vacant channel) of a station that operates according to the IEEE802.11a standard can succeed while no signal is being transmitted in an unused section of the HiSWANa or HiperLAN/2 system, which causes a collision between the systems. Therefore, it is difficult to use mixed wireless LAN systems based on these different standards, and building a wireless LAN system requires an adaptation of the system to either of the standards.

DISCLOSURE OF THE INVENTION

The present invention has been made in view of the above-mentioned points, and it is an object thereof to provide a wireless LAN system and a signal collision avoidance method for the same, which can avoid the collision of signals between a wireless LAN system based on a communication scheme in which communication is initiated at fixed intervals, and a wireless LAN system based on a communication scheme in which communication is initiated after waiting for a vacant channel.

In one aspect of the present invention, a wireless LAN system initiating communication at fixed intervals includes: no-signal section determining means for determining whether a no signal section has occurred in a communication frame upon scheduling of the communication frame; and scheduling means which, when the no-signal section determining means determines that the no signal section has occurred in the communication frame, schedules the transmission of a communication disable signal to a channel to disable communication in the no signal section with another wireless LAN system initiating communication after waiting until the channel through which the wireless LAN system concerned is performing communication becomes vacant.

In another aspect of the present invention, a wireless LAN system initiating communication at fixed intervals includes: no-signal section determining means for determining whether there is a no signal section between a data block in a downlink phase for transmitting downlink data and a data block in an uplink phase allocated first to transmit uplink data, both of which are contained in frame data to be arranged upon scheduling of a communication frame; and scheduling means which, when the no-signal section determining means determines that there is a no signal section, schedules the transmission of a communication disable signal to a channel to disable communication in the no signal section with another wireless LAN system initiating communication after waiting until the channel through which the wireless LAN system concerned is performing communication becomes vacant.

In the above wireless LAN system of the present invention, when the no signal section is longer than a gap time from the finish time of the downlink phase until another wireless LAN system detects the vacancy of the channel, the scheduling means transmits the communication disable signal at timing earlier than the gap time.

In still another aspect of the present invention, a wireless LAN system initiating communication at fixed intervals includes: no-signal section determining means for determining whether there is a no signal section between data groups in uplink phases, which transmit uplink data belonging to different groups defined with different delay times, both of which are contained in frame data to be arranged upon scheduling of a communication frame; and scheduling means which, when the no-signal section determining means determines that there is a no signal section, schedules the transmission of a communication disable signal to a channel to disable communication in the no signal section with another wireless LAN system initiating communication after waiting until the channel through which the wireless LAN system concerned is performing communication becomes vacant.

In the above wireless LAN system of the present invention, when the no signal section is longer than a gap time from the finish time of the data block allocated first between groups of data blocks in the uplink phases until another wireless LAN system detects the vacancy of the channel, the scheduling means transmits the communication disable signal at timing earlier than the gap time.

In yet another aspect of the present invention, a wireless LAN system initiating communication at fixed intervals includes: no-signal section determining means for determining whether there is a no signal section between a data block in a downlink phase for transmitting downlink data and a data block in an uplink phase allocated first to transmit uplink data, both of which are contained in frame data to be arranged upon scheduling of a communication frame; and scheduling means which, when the no-signal section determining means determines that there is a no signal section, schedules the transmission to a channel of a channel in use signal to indicate another wireless LAN system that the channel is in use, another wireless LAN system initiating communication after waiting until the channel through which the wireless LAN system concerned is performing communication becomes vacant.

In the above wireless LAN system of the present invention, when the no signal section is longer than a gap time from the finish time of the downlink phase until another wireless LAN system detects the vacancy of the channel, the scheduling means transmits the channel in use signal at timing earlier than the gap time.

In a further aspect of the present invention, a wireless LAN system initiating communication at fixed intervals includes: no-signal section determining means for determining whether there is a no signal section between data groups in uplink phases, which transmit uplink data belonging to different groups defined with different delay times, both of which are contained in frame data to be arranged upon scheduling of a communication frame; and scheduling means which, when the no-signal section determining means determines that there is a no signal section, schedules the transmission to a channel of a channel in use signal to indicate another wireless LAN system that the channel is in use, another wireless LAN system initiating communication after waiting until the channel through which the wireless LAN system concerned is performing communication becomes vacant.

In the above wireless LAN system of the present invention, when the no signal section is longer than a gap time from the finish time of the data block allocated first between groups of data blocks in the uplink phases until another wireless LAN system detects the vacancy of the channel, the scheduling means transmits the channel in use signal at timing earlier than the gap time.

In the above wireless LAN system, the scheduling means transmits the channel in use signal repeatedly and intermittently at intervals not longer than the gap time during which another wireless LAN system detects the vacancy of the channel, and for the duration of time enough to determine that the channel is in use when another wireless LAN system detects the vacancy of the channel.

In the above wireless LAN system of the present invention, the scheduling means transmits a signal as the channel in use signal, which terminals belonging to the wireless LAN system can usefully receive as a retransmission packet.

In the above wireless LAN system of the present invention, the scheduling means transmits a signal as the channel in use signal, which terminals belonging to the wireless LAN system can usefully receive as a preamble signal.

Still another aspect of the present invention is that a signal collision avoidance method for a wireless LAN system initiating communication at fixed intervals includes: a step of determining whether a no signal section has occurred in a communication frame upon scheduling of the communication frame; and a step of providing a communication disable signal in the communication frame when it is determined that the no signal section has occurred in the communication frame, to disable communication in the no signal section with another wireless LAN system initiating communication after waiting until a channel through which the wireless LAN system concerned is performing communication becomes vacant.

Yet another aspect of the present invention is that a signal collision avoidance method for a wireless LAN system initiating communication at fixed intervals includes: a step of determining whether a no signal section has occurred in a communication frame due to no data to be arranged between a data block in a downlink phase for transmitting downlink data and a data block in an uplink phase allocated first to transmit uplink data, both of which are contained in frame data to be arranged upon scheduling of the communication frame; and a step of providing a communication disable signal in the communication frame when it is determined that the no-signal section has occurred, to disable communication in the no signal section with another wireless LAN system initiating communication after waiting until a channel through which the wireless LAN system concerned is performing communication becomes vacant.

In the above signal collision avoidance method for the wireless LAN system of the present invention, when the no signal section is longer than a gap time from the finish time of the downlink phase until another wireless LAN system detects the vacancy of the channel, the transmission of the communication disable signal is initiated at timing earlier than the gap time.

A further aspect of the present invention is that a signal collision avoidance method for a wireless LAN system initiating communication at fixed intervals includes: a step of determining whether a no signal section has occurred in a communication frame due to no data to be arranged between data groups in uplink phases, which transmit uplink data belonging to different groups defined with different delay times, both of which are contained in frame data to be arranged upon scheduling of the communication frame; and a step of providing a communication disable signal in the communication frame when it is determined that the no-signal section has occurred in the communication frame, to disable communication in the no signal section with another wireless LAN system initiating communication after waiting until a channel through which the wireless LAN system concerned is performing communication becomes vacant.

In the above signal collision avoidance method for the wireless LAN system of the present invention, when the no signal section is longer than a gap time from the finish time of the data block allocated first between groups of data blocks in the uplink phases until another wireless LAN system detects the vacancy of the channel, the transmission of the communication disable signal is initiated at timing earlier than the gap time.

A further aspect of the present invention is that a signal collision avoidance method for a wireless LAN system initiating communication at fixed intervals includes: a step of determining whether a no signal section has occurred in a communication frame due to no data to be arranged between a data block in a downlink phase for transmitting downlink data and a data block in an uplink phase allocated first to transmit uplink data, both of which are contained in frame data to be arranged upon scheduling of the communication frame; and a step of providing a channel in use signal when it is determined that the no-signal section has occurred in the communication frame, to indicate another wireless LAN system that a channel is in use, another wireless LAN system initiating communication after waiting until the channel through which the wireless LAN system concerned is performing communication becomes vacant.

In the above signal collision avoidance method for the wireless LAN system of the present invention, when the no signal section is longer than a gap time from the finish time of the downlink phase until another wireless LAN system detects the vacancy of the channel, the transmission of the channel in use signal is initiated at timing earlier than the gap time.

The other aspect of the present invention is that a signal collision avoidance method for a wireless LAN system initiating communication at fixed intervals includes: a step of determining whether a no signal section has occurred in a communication frame due to no data to be arranged between data groups in uplink phases, which transmit uplink data belonging to different groups defined with different delay times, both of which are contained in frame data to be arranged upon scheduling of the communication frame; and a step of providing a channel in use signal in an area corresponding to the no signal section when it is determined that the no-signal section has occurred in the communication frame, to indicate another wireless LAN system that a channel is in use, another wireless LAN system initiating communication after waiting until the channel through which the wireless LAN system concerned is performing communication becomes vacant.

In the above signal collision avoidance method for the wireless LAN system of the present invention, when the no signal section is longer than a gap time from the finish time of the data block allocated first between groups of data blocks in the uplink phases until another wireless LAN system detects the vacancy of the channel, the transmission of the channel in use signal is initiated at timing earlier than the gap time.

In the above signal collision avoidance method for the wireless LAN system of the present invention, the channel in use signal is transmitted repeatedly and intermittently at intervals not longer than the gap time during which another wireless LAN system detects the vacancy of the channel, and for the duration of time enough to determine that the channel is in use when another wireless LAN system detects the vacancy of the channel.

In the above signal collision avoidance method for the wireless LAN system of the present invention, the channel in use signal is a signal which terminals belonging to the wireless LAN system can usefully receive as a retransmission packet.

In the above signal collision avoidance method for the wireless LAN system of the present invention, the channel in use signal is a signal which terminals belonging to the wireless LAN system can usefully receive as a preamble signal.

According to the present invention, even when a wireless LAN system initiating communication at fixed intervals, for example, a wireless LAN system based on the HiSWANa or HiperLAN/2 standard, and a wireless LAN system initiating communication after waiting for the vacancy of a channel, for example, a wireless LAN system based on the IEEE802.11a standard exist together in each other's radio areas, since the collision of signals between them can be avoided, a system in which these wireless LAN systems are mixed can easily be built.

BEST MODES FOR CARRYING OUT THE INVENTION

The gist of the present invention is as follows. In a wireless LAN system of the type that initiates communication at fixed intervals, when a no signal section has occurred between data blocks upon scheduling of a communication frame, channel reservation data for controlling transmission from stations in a wireless LAN system (a wireless LAN system other than the above wireless LAN system, that is, another wireless LAN system) initiating communication after waiting for the vacancy of a channel, or a band occupied signal to indicate another wireless LAN system that the channel is in use is provided to prevent another LAN system from using the no signal section.

Embodiments of the present invention will be described below with reference to the accompanying drawings.

First Embodiment

Figure 1:
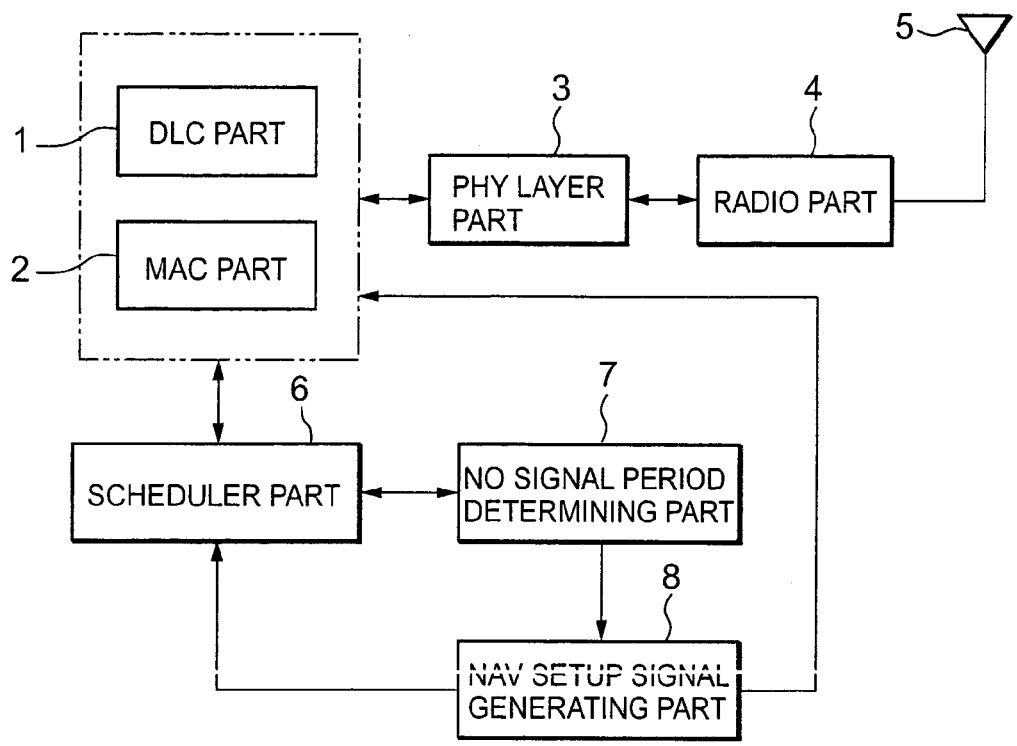
FIG. 1 is a block diagram showing a configuration of an access point in a wireless LAN system according to a first embodiment of the present invention.

FIG. 1 is a block diagram showing a configuration of an access point in a wireless LAN system according to the first embodiment of the present invention.

In FIG. 1, the access point in the wireless LAN system according to the embodiment includes a DLC part (hereinbelow called the data link part) 1, a MAC part (hereinbelow called the medium access part) 2, a PHY (Physical Layer Protocol) layer part 3, a radio part 4, an antenna 5, a scheduler part 6, a no signal period determining part 7, and a NAV setup signal generating part 8.

The data link part 1 controls the transmission of data, and has three processing phases: connection establishment, data transfer, and data link connection release. The medium access part 2 controls the way of transmitting data to a LAN cable (medium) and the like. The PHY layer part 3 interconverts data to be exchanged and signals according to the channel, and outputs the converted data. The radio part 4 converts the data from the PHY layer part 3 into a radio signal for output to the antenna 5, while it down-converts a radio signal captured by the antenna 5 and outputs the same to the PHY layer part 3.

The scheduler part 6 lines up in time sequence plural pieces of data obtained from an upper layer, not shown, through the medium access part 2 to create a communication frame. Then the scheduler part 6 sends the created communication frame to the medium access part 2. In this case, the scheduler part 6 sends the no signal period determining part 7 the state of creation during the creation of the communication frame to make the no signal period determining part 7 determine the presence or absence of a no signal section and the length of the no signal period. Upon receipt of a report from the no signal period determining part 7 that there has been a no signal period, the scheduler part 6 performs scheduling for transmitting a NAV setup signal based on the IEEE802.11a standard as channel reservation data (corresponding to a communication disable signal). The no signal period determining part 7 monitors an interval between a downlink phase and an uplink phase, and an interval between two adjacent uplink phases, which come before or after each other in time sequence. If there is a no signal period at least in either interval, the no signal period determining part 7 informs of it the scheduler part 6 and the NAV setup signal generating part 8.

Figure 2:
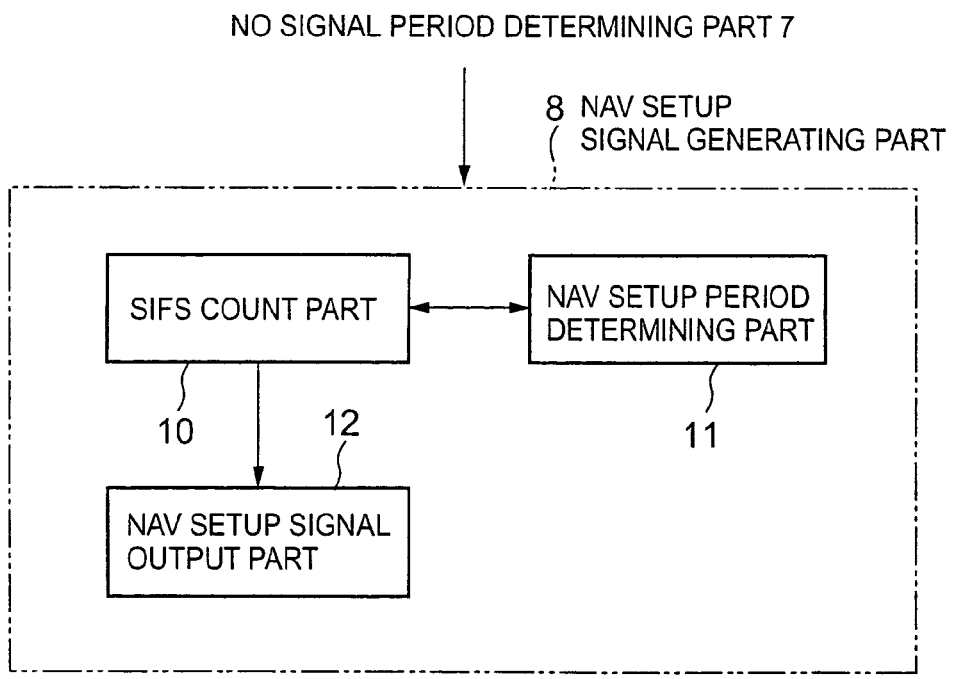
FIG. 2 is a block diagram showing a configuration of a NAV setup signal generating part in FIG. 1.

As shown in the block diagram of FIG. 2, the NAV setup signal generating part 8 includes a SIFS (Short Inter Frame Space) count part 10, a NAV setup period determining part 11, and a NAV setup signal output part 12. The SIFS count part 10 measures a no signal period, and based on the result of measurement, the NAV setup period determining part 11 determines the NAV setup period. Once the NAV setup period is decided, a NAV setup signal with a length corresponding to the period is outputted from the NAV setup signal output part 12. In this case, the NAV setup signal from the NAV setup signal generating part 8 is inputted to the data link part 1 and the medium access part 2, respectively. On the other hand, a signal for indicating a period during which the NAV setup signal is outputted is inputted from the NAV setup signal generating part 8 to the scheduler part 6.

Figure 3:
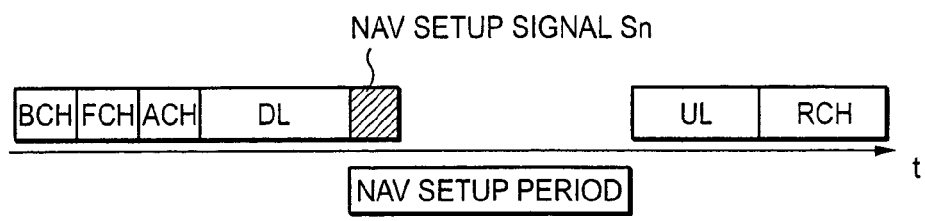
FIG. 3 is a diagram showing the arrangement of data upon scheduling of a communication frame at the access point in the wireless LAN system according to the first embodiment of the present invention.

FIG. 3 is a diagram showing the arrangement of data upon scheduling of a communication frame at the access point in the wireless LAN system according to the first embodiment of the present invention.

The operation of the access point configured such above will be described next.

Upon scheduling of a communication frame, when informed from the no signal period determining part 7 that a no signal section has occurred between a downlink phase and an uplink phase, the scheduler part 6 puts a NAV setup signal Sn behind the downlink phase, in accordance with instructions from the NAV setup signal generating part 8, as channel reservation data that covers the no signal section.

The scheduler part 6 performs scheduling for arranging the NAV setup signal Sn and transmits the arranged NAV setup signal Sn, so that the NAV is set in the downlink phase at stations in an IEEE802.11a wireless LAN system. It can prevent the stations in the IEEE802.11a wireless LAN system from transmitting data, and hence avoid the collision of signals within the period of the uplink phase due to an IEEE802.11a frame interrupt.

According to the embodiment, when a no signal section has occurred in a communication frame upon scheduling of the communication frame, scheduling is performed for transmitting a NAV setup signal (communication disable signal) as channel reservation data that covers the no signal section, to disable communication within the no signal section with the IEEE802.11a wireless LAN system initiating communication after waiting for the vacancy of a channel. Therefore, even when a HiSWANa or HiperLAN/2 wireless LAN system initiating communication at fixed intervals and an IEEE802.11a wireless LAN system initiating communication after waiting for the vacancy of a channel exist together in each other's radio areas, the collision of signals between the systems can be avoided.

In the embodiment, the NAV setup signal Sn is put immediately behind the downlink phase, but it can be set before the no signal section. In this case, the same effect can be obtained. Further, the NAV setup period may be any length of time as long as it can cover at least the no signal section concerned. If the NAV setup period is so set that it ranges up to another section such as RCH, collisions that could occur in that section can also be avoided.

Second Embodiment

Since the access point in the wireless LAN system according to the second embodiment of the present invention has the same configuration as that according to the first embodiment, the illustration of the configuration will be omitted, using FIG. 1 or FIG. 2 as needed.

Figure 4:
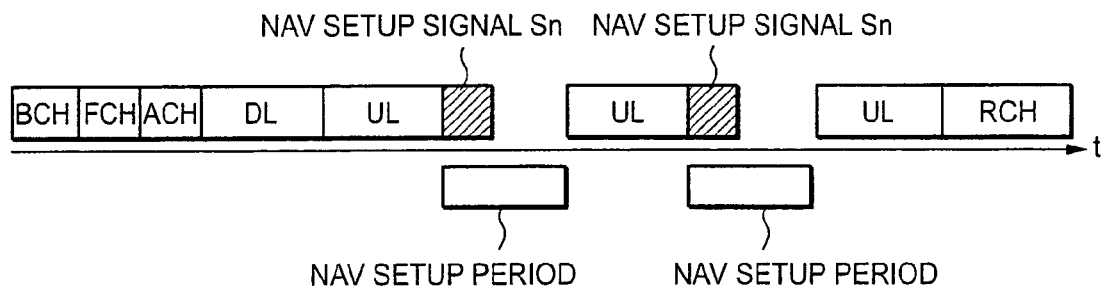
FIG. 4 is a diagram showing the arrangement of data upon scheduling of a communication frame at the access point in the wireless LAN system according to a second embodiment of the present invention.

FIG. 4 is a diagram showing the arrangement of data upon scheduling of a communication frame at the access point in the wireless LAN system according to the second embodiment of the present invention.

Upon scheduling of a communication frame, when informed from the no signal period determining part 7 that a no signal section has occurred between two adjacent uplink phases, which come before or after each other in time sequence, the scheduler part 6 puts a NAV setup signal Sn behind the preceding uplink phase, in accordance with instructions from the NAV setup signal generating part 8, as channel reservation data that covers the no signal section. The two adjacent uplink phases that come before or after each other in time sequence is not limited to a pair alone. If there are plural pairs, the scheduler part 6 will perform the same control for each of the pairs, respectively. The same goes for the other embodiments to be described below.

The scheduler part 6 performs scheduling for arranging the NAV setup signal Sn and transmits the arranged NAV setup signal Sn, so that the NAV is set in the uplink phase at stations in an IEEE802.11a wireless LAN system. It can prevent the stations in the IEEE802.11a wireless LAN system from transmitting data, and hence avoid the collision of signals within the period of the following uplink phase due to an IEEE802.11a frame interrupt.

In the embodiment, the NAV setup signal Sn is put immediately behind the uplink phase that is ahead in time sequence, but it can be set before the no signal section. In this case, the same effect can be obtained. Further, if there are a plurality of no signal sections, such a NAV as to cover all the no signal sections can be set at the first stage. In this case, the transmission of the NAV can be completed at a time. The NAV may also cover the no signal section between the downlink phase and the uplink phase together with the no signal section between the uplink phases. In addition, the NAV setup period may be any length of time as long as it can cover at least the no signal section concerned. If the NAV setup period is so set that it ranges up to another section such as RCH, collisions that could occur in that section can also be avoided.

Third Embodiment

Since the access point in the wireless LAN system according to the third embodiment of the present invention has the same configuration as that according to the first embodiment, the illustration of the configuration will be omitted, using FIG. 1 or FIG. 2 as needed.

Figure 5:
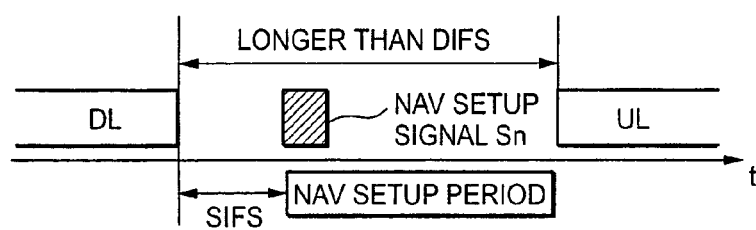
FIG. 5 is a diagram showing the arrangement of data upon scheduling of a communication frame at the access point in the wireless LAN system according to a third embodiment of the present invention.

FIG. 5 is a diagram showing the arrangement of data upon scheduling of a communication frame at the access point in the wireless LAN system according to the third embodiment of the present invention.

Upon scheduling of a communication frame, when informed from the no signal period determining part 7 that a no signal section has occurred between a downlink phase and an uplink phase, the scheduler part 6 performs scheduling as follows. That is, when the no signal section is longer than the carrier sense time of a station in an IEEE802.11a wireless LAN system, the scheduler part 6 puts a NAV setup signal Sn between the downlink phase and the uplink phase prior to the success of carrier sense of the station, in accordance with instructions from the NAV setup signal generating part 8, as channel reservation data that covers the no signal section.

In this case, as shown in FIG. 5 for example, when the no signal section is longer than a DCF interframe space (DIFS), the NAV setup signal Sn that covers the no signal section concerned is put behind a short interframe space (SIFS) as channel reservation data.

The scheduler part 6 thus performs scheduling for arranging the NAV setup signal Sn and transmits the arranged NAV setup signal Sn, so that the NAV is set at the station in the IEEE802.11a wireless LAN system. It can prevent the station from initiating transmission within the no signal section, and hence avoid the collision of signals within the period of the uplink phase due to an IEEE802.11a frame interrupt. Especially, according to the embodiment, since the NAV is set only when an IEEE802.11a interrupt might occur in the first embodiment, collisions can be avoided more efficiently.

Fourth Embodiment

Since the access point in the wireless LAN system according to the fourth embodiment of the present invention has the same configuration as that according to the first embodiment, the illustration of the configuration will be omitted, using FIG. 1 or FIG. 2 as needed.

Figure 6:
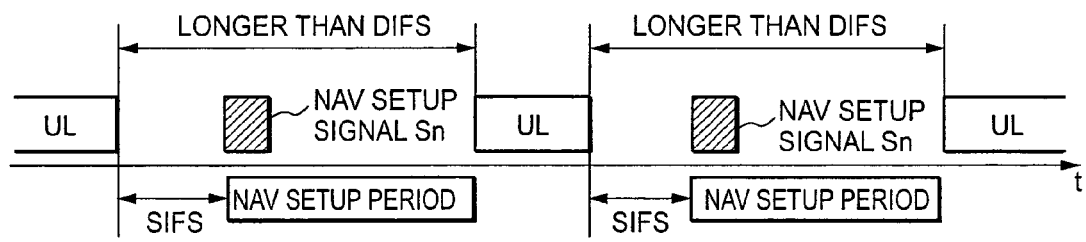
FIG. 6 is a diagram showing the arrangement of data upon scheduling of a communication frame at the access point in the wireless LAN system according to a fourth embodiment of the present invention.

FIG. 6 is a diagram showing the arrangement of data upon scheduling of a communication frame at the access point in the wireless LAN system according to the fourth embodiment of the present invention.

Upon scheduling of a communication frame, when informed from the no signal period determining part 7 that a no signal section has occurred between two adjacent uplink phases, which come before or after each other in time sequence, the scheduler part 6 performs scheduling as follows. That is, when the no signal section is longer than the carrier sense time of a station in an IEEE802.11a wireless LAN system, the scheduler part 6 puts a NAV setup signal Sn behind the preceding uplink phase prior to the success of carrier sense of the station, in accordance with instructions from the NAV setup signal generating part 8, as channel reservation data that covers the no signal section.

In this case, as shown in FIG. 6 for example, when the no signal section is longer than a DCF interframe space (DIFS), the NAV setup signal Sn is put behind the preceding uplink phase, that is, behind a short interframe space (SIFS) as channel reservation data.

The scheduler part 6 thus performs scheduling for arranging the NAV setup signal Sn and transmits the arranged NAV setup signal Sn, so that the NAV is set at the station in the IEEE802.11a wireless LAN system. It can prevent the station from initiating transmission, and hence avoid the collision of signals within the period of the following uplink phase due to an IEEE802.11a frame interrupt. Especially, according to the embodiment, since the NAV is set only when an IEEE802.11a interrupt might occur in the first embodiment, collisions can be avoided more efficiently.

If there are a plurality of no signal sections, such a NAV as to cover all the no signal sections can be set at the first stage. In this case, the transmission of the NAV can be completed at a time. The NAV may also cover the no signal section between the downlink phase and the uplink phase together with the no signal section between the uplink phases. In addition, the NAV setup period may be any length of time as long as it can cover at least the no signal section concerned. If the NAV setup period is so set that it ranges up to another section such as RCH, collisions that could occur in that section can also be avoided.

Fifth Embodiment

Figure 7:
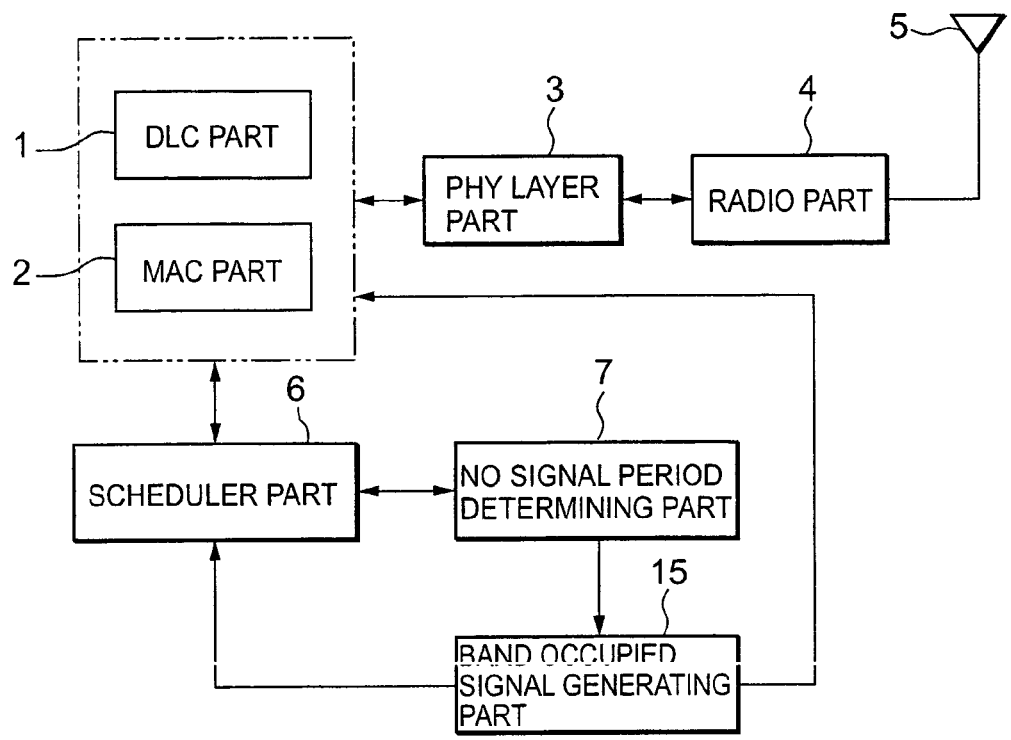
FIG. 7 is a block diagram showing a configuration of an access point in a wireless LAN system according to a fifth embodiment of the present invention.

FIG. 7 is a block diagram showing a configuration of an access point in a wireless LAN system according to the fifth embodiment of the present invention. In the drawing, portions common to those described above in FIG. 1 are given the same reference numerals to omit the descriptions.

In FIG. 7, the access point in the wireless LAN system according to this embodiment includes a band occupied signal generating part 15, instead of the NAV setup signal generating part 8 of FIG. 1, for generating a band occupied signal (channel in use signal) So, which indicates an IEEE802.11a wireless LAN system that the HiSWANa wireless LAN system is using a no signal section.

During creation of a communication frame, the scheduler part 6 sends the no signal period determining part 7 the state of the creation to make the no signal period determining part 7 determine the presence or absence of a no signal section and the length of the no signal period if any. Then, upon receipt of a report from the no signal period determining part 7 that there has been a no signal period, the scheduler part 6 performs scheduling for transmitting a band occupied signal. The no signal period determining part 7 monitors an interval between a downlink phase and an uplink phase, and an interval between two adjacent uplink phases, which come before or after each other in time sequence. If there is a no signal period at least in either interval, the no signal period determining part 7 informs of it the scheduler part 6 and the band occupied signal generating part 15. As shown in the block diagram of FIG. 8, the band occupied signal generating part 15 includes the SIFS count part 10, a band occupied signal setup period determining part 16, and a band occupied signal output part 17.

The SIFS count part 10 measures a no signal period, and based on the result of measurement, the band occupied signal setup period determining part 16 determines a period for setting a band occupied signal. Once the band occupied signal setup period is decided, a band occupied signal with a length corresponding to the period is outputted from the band occupied signal output part 17. In this case, the band occupied signal from the band occupied signal output part 17 is inputted to the data link part 1 and the medium access part 2, respectively. On the other hand, a signal for indicating a period during which the band occupied signal is outputted is inputted from the band occupied signal generating part 15 to the scheduler part 6. The band occupied signal is, for example, dummy data, which indicates an IEEE802.11a wireless LAN system initiating communication after waiting for the vacancy of a channel that the channel is in use.

Figure 9:
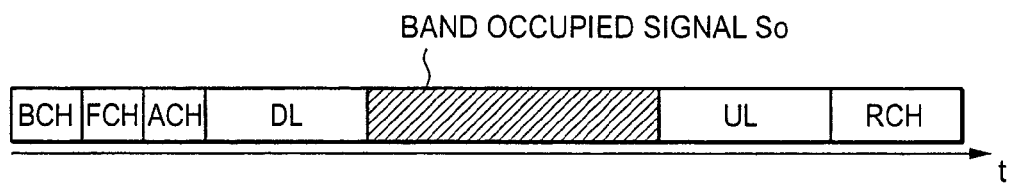
FIG. 9 is a diagram showing the arrangement of data upon scheduling a communication frame at the access point in the wireless LAN system according to the fifth embodiment of the present invention.

FIG. 9 is a diagram showing the arrangement of data upon scheduling of a communication frame at the access point in the wireless LAN system according to the fifth embodiment of the present invention.

Upon scheduling of a communication frame, when informed from the band occupied signal setup period determining part 16 that a no signal section has occurred between a downlink phase and an uplink phase, the scheduler part 6 puts a band occupied signal (corresponding to a channel in use signal)So behind the downlink phase, in accordance with instructions from the band occupied signal generating part 8, to indicate that HiSWANa is using the no signal section concerned.

The scheduler part 6 performs scheduling for arranging the band occupied signal So and transmits the arranged band occupied signal So, so that the channel becomes busy whenever any IEEE802.11a communication station performs carrier sense. It can prevent the station concerned from initiating transmission within the no signal section, and hence avoid the collision of signals within the period of the uplink phase due to an IEEE802.11a frame interrupt. Especially, according to the embodiment, even the collision of signals that could occur in the first embodiment with such a station that does not support any NAV setup signal (that cannot understand the NAV setup signal) can be avoided.

Sixth Embodiment

Figure 8:
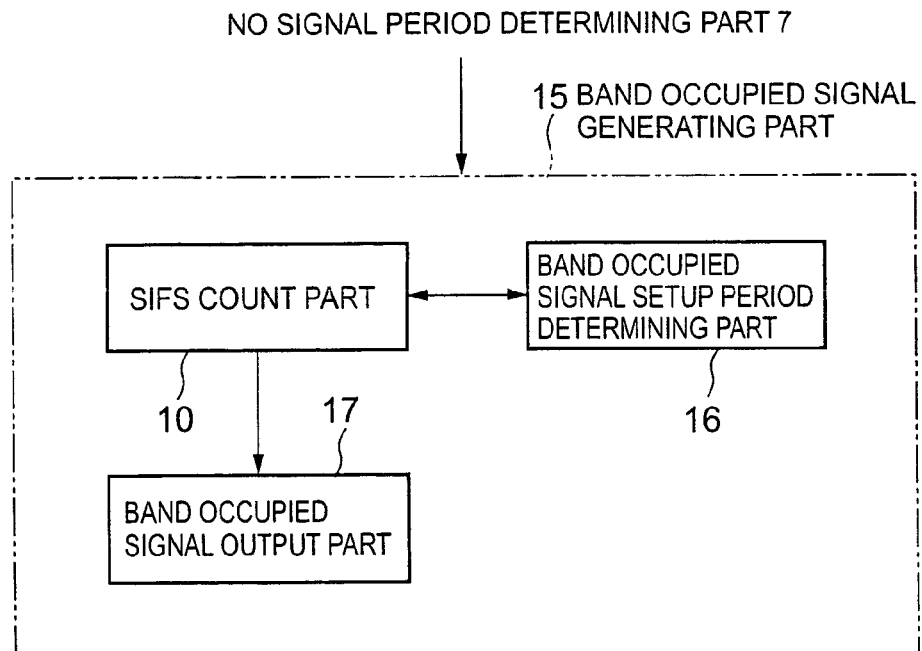
FIG. 8 is a block diagram showing a configuration of a band occupied signal generating part in FIG. 7.

Since the access point in the wireless LAN system according to the sixth embodiment of the present invention has the same configuration as that according to the fifth embodiment, the illustration of the configuration will be omitted, using FIG. 7 or FIG. 8 as needed.

Figure 10:
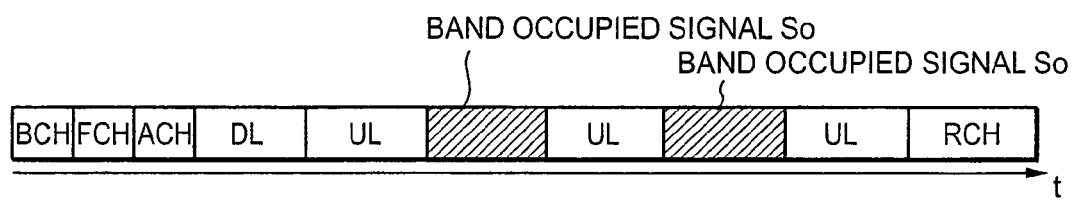
FIG. 10 is a diagram showing the arrangement of data upon scheduling a communication frame at the access point in the wireless LAN system according to a sixth embodiment of the present invention.

FIG. 10 is a diagram showing the arrangement of data upon scheduling of a communication frame at the access point in the wireless LAN system according to the sixth embodiment of the present invention.

Upon scheduling of a communication channel, when informed from the band occupied signal setup period determining part 16 that a no signal section has occurred between two adjacent uplink phases, which come before or after each other in time sequence, the scheduler part 6 arranges a band occupied signal So in accordance with instructions from the band occupied signal generating part 15 to indicate that HiSWANa is using the no signal section concerned. Like the fifth embodiment, this embodiment uses dummy data, for example, as the band occupied signal So.

The scheduler part 6 performs scheduling for arranging the band occupied signal So and transmits the arranged band occupied signal So, so that the channel becomes busy whenever any IEEE802.11a communication station performs carrier sense. It can prevent the station concerned from initiating transmission within the no signal section, and hence avoid the collision of signals within the period of the uplink phase due to an IEEE802.11a frame interrupt. Especially, according to the embodiment, even the collision of signals that could occur in the second embodiment with such a station that does not support any NAV setup signal (that cannot understand the NAV setup signal) can be avoided.

Seventh Embodiment

Since the access point in the wireless LAN system according to the seventh embodiment of the present invention has the same configuration as that according to the fifth embodiment, the illustration of the configuration will be omitted, using FIG. 7 or FIG. 8 as needed.

Figure 11:
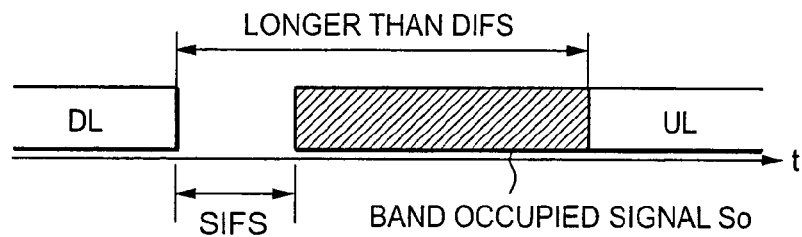
FIG. 11 is a diagram showing the arrangement of data upon scheduling a communication frame at the access point in the wireless LAN system according to a seventh embodiment of the present invention.

FIG. 11 is a diagram showing the arrangement of data upon scheduling of a communication frame at the access point in the wireless LAN system according to the seventh embodiment of the present invention.

Upon scheduling of a communication channel, when informed from the band occupied signal setup period determining part 16 that a no signal section has occurred between a downlink phase and an uplink phase, the scheduler part 6 performs scheduling as follows. That is, when the no signal section is longer than the carrier sense time of a station in an IEEE802.11a wireless LAN system, the scheduler part 6 puts a band occupied signal So between the downlink phase and the uplink phase prior to the success of carrier sense of the station, upon scheduling of a communication frame, in accordance with instructions from the band occupied signal generating part 15, as dummy data to indicate that HiSWANa is using the no signal section concerned.

In this case, as shown in FIG. 11 for example, when the no signal section is longer than a DCF interframe space (DIFS), the band occupied signal So is put behind a short interframe space (SIFS) to indicate that HiSWANa is using the no signal section concerned.

The scheduler part 6 thus performs scheduling for arranging the band occupied signal So and transmits the arranged band occupied signal So, so that the channel becomes busy whenever any station in an IEEE802.11a wireless LAN system performs carrier sense. It can prevent the station concerned from initiating transmission within the no signal section, and hence avoid the collision of signals within the period of the uplink phase due to an IEEE802.11a frame interrupt. Especially, according to the embodiment, the transmission of the band occupied signal So is carried out only when an IEEE802.11a interrupt might occur in the fifth embodiment, thus avoiding collisions more efficiently.

Eighth Embodiment

Since the access point in the wireless LAN system according to the eighth embodiment of the present invention has the same configuration as that according to the fifth embodiment, the illustration of the configuration will be omitted, using FIG. 7 or FIG. 8 as needed.

Figure 12:
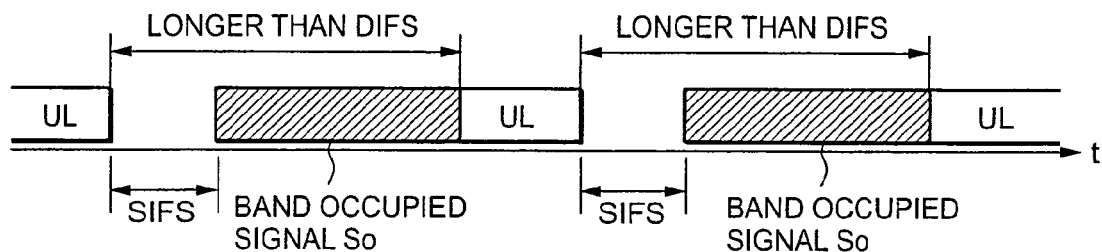
FIG. 12 is a diagram showing the arrangement of data upon scheduling a communication frame at the access point in the wireless LAN system according to an eighth embodiment of the present invention.

FIG. 12 is a diagram showing the arrangement of data upon scheduling of a communication frame at the access point in the wireless LAN system according to the eighth embodiment of the present invention.

Upon scheduling of a communication frame, when informed from the no signal period determining part 7 that a no signal section has occurred between two adjacent uplink phases, which come before or after each other in time sequence, the scheduler part 6 arranges a band occupied signal So as follows. That is, when the no signal section is longer than the carrier sense time of a station in an IEEE802.11a wireless LAN system, the scheduler part 6 puts a band occupied signal So between the two uplink phases prior to the success of carrier sense of the station, in accordance with instructions from the band occupied signal generating part 15, to indicate that HiSWANa is using the no signal section concerned.

In this case, as shown in FIG. 12 for example, when the no signal section is longer than a DCF interframe space (DIFS), the band occupied signal So is put behind a short interframe space (SIFS).

The scheduler part 6 thus performs scheduling for arranging the band occupied signal So and transmits the arranged band occupied signal So, so that the channel becomes busy whenever any station in the IEEE802.11a wireless LAN system performs carrier sense. It can prevent the station concerned from initiating transmission within the no signal section, and hence avoid the collision of signals within the period of the following uplink phase due to an IEEE802.11a frame interrupt. Especially, according to the embodiment, the transmission of the band occupied signal So is carried out only when an IEEE802.11a interrupt might occur in the sixth embodiment, thus avoiding collisions more efficiently.

Ninth Embodiment

Since the access point in the wireless LAN system according to the ninth embodiment of the present invention has the same configuration as that according to the fifth embodiment, the illustration of the configuration will be omitted, using FIG. 7 or FIG. 8 as needed.

Figure 13:
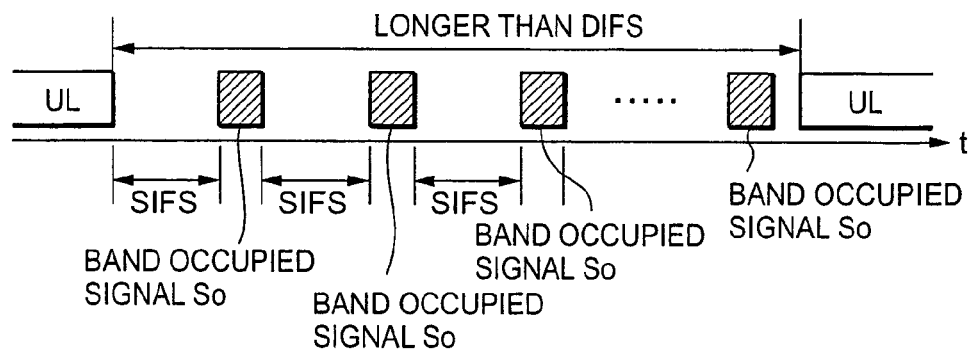
FIG. 13 is a diagram showing the arrangement of data upon scheduling a communication frame at the access point in the wireless LAN system according to a ninth embodiment of the present invention.

FIG. 13 is a diagram showing the arrangement of data upon scheduling of a communication frame at the access point in the wireless LAN system according to the ninth embodiment of the present invention.

Upon scheduling of a communication frame, when informed from the no signal section determining part 7 that a no signal section has occurred between a downlink phase and an uplink phase, the scheduler part 6 performs scheduling as follows. That is, when the no signal section is longer than the carrier sense time of any station, the scheduler part 6 arranges a band occupied signal So prior to the success of carrier sense of the station, in accordance with instructions from the band occupied signal generating part 15, as dummy data to indicate that HiSWANa is using the no signal section concerned. Then, after a predetermined elapsed time, which is enough for the carrier sense of the station to determine that the channel is busy, the transmission is temporarily terminated, and the transmission and termination of the band occupied signal So are repeated until the remaining length of the no signal section becomes shorter than the carrier sense time, for example, until it becomes shorter than the DCF interframe spece DIFS. Specifically, the transmission and termination of dummy data are repeated.

The repetition of the transmission and termination of the band occupied signal So makes the channel become busy whenever any station in the IEEE802.11a wireless LAN system performs carrier sense. It can prevent the station concerned from initiating transmission within the no signal section, and hence avoid the collision of signals within the period of the uplink phase due to an IEEE802.11a frame interrupt.

Although this embodiment exemplifies a no signal section between a downlink phase and an uplink phase, the same method can be applied to a no signal section between two adjacent uplink phases, which come before or after each other in time sequence. In this case, the same effect can be obtained. Especially, according to the embodiment, the transmission of the band and occupied signal So is carried out only for a minimum period in the seventh and eighth embodiments, thus avoiding collisions more efficiently.

Tenth Embodiment

Since the access point in the wireless LAN system according to the tenth embodiment of the present invention has the same configuration as that according to the fifth embodiment, the illustration of the configuration will be omitted, using FIG. 7 or FIG. 8 as needed.

Figure 14:
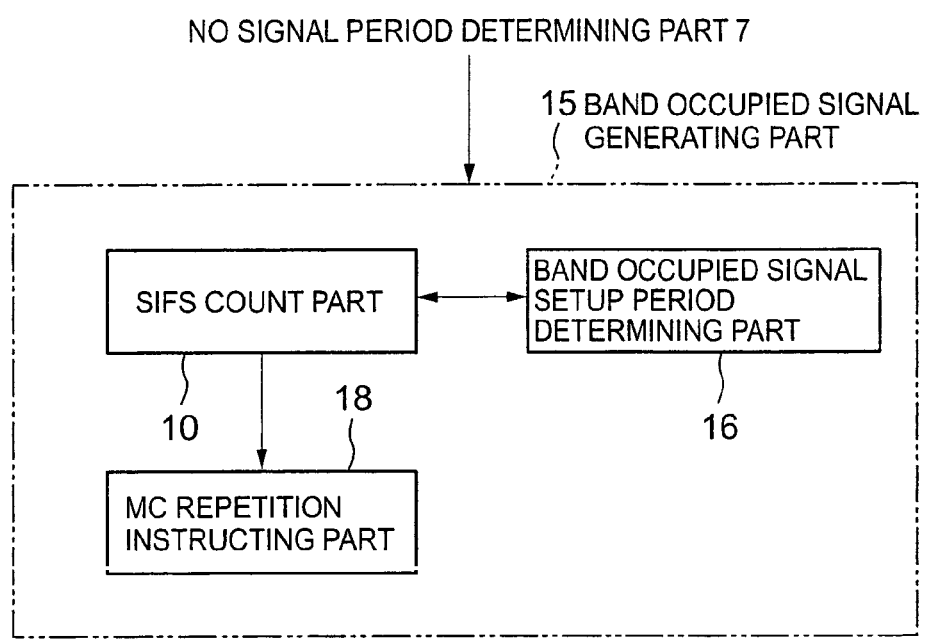
FIG. 14 is a block diagram showing a configuration of an access point in a wireless LAN system according to a tenth embodiment of the present invention.
Figure 15:
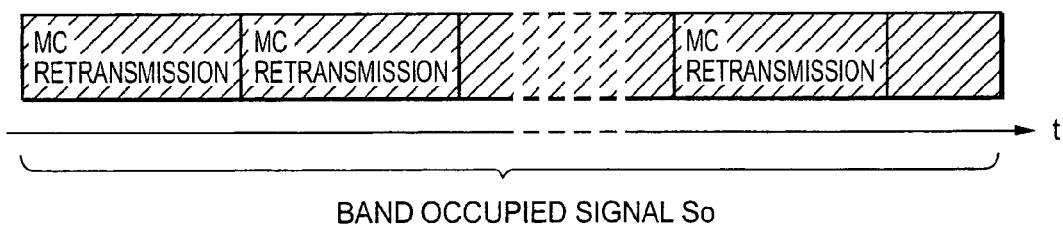
FIG. 15 is a block diagram showing a band occupied signal obtained in the band occupied signal generating part in FIG. 14.

As shown in the block diagram of FIG. 14, the band occupied signal generating part 15 in this embodiment has an MC repetition instructing part 18 for instructing the repetition of multi-cast data based on processing by the data link part 1 and the medium access part 2. The MC repetition instructing part 18 instructs the arrangement of a set of multi-cast, iterative HiSWANa packets (retransmission packets) that is large enough in number to be inserted in the period for setting a band occupied signal determined by the band occupied signal setup period determining part 16. FIG. 15 is a diagram showing a band occupied signal obtained in the band occupied signal generating part 15 in FIG. 14. The term "multi-cast" means that mobile terminals belonging to the system can receive the iterative packets.

According to this configuration, even in multi-cast data communication in which retransmission is not performed in response to normal retransmission requests, a mobile terminal which has determined the rejection of a packet due to an error or the like can obtain and rescue the packet from the iterative packets, thereby improving the frequency of error in packets in the multi-cast communication.

Although this embodiment illustrated multi-cast communication, it is of course applicable to any other connection.

The signal collision avoidance method for the wireless LAN system according to this embodiment can also be applied to each of the wireless LAN systems according to the aforementioned embodiments 5 through 9.

Eleventh Embodiment

Since the access point in the wireless LAN system according to the eleventh embodiment of the present invention has the same configuration as that according to the fifth embodiment, the illustration of the configuration will be omitted, using FIG. 7 or FIG. 8 as needed.

Figure 16:
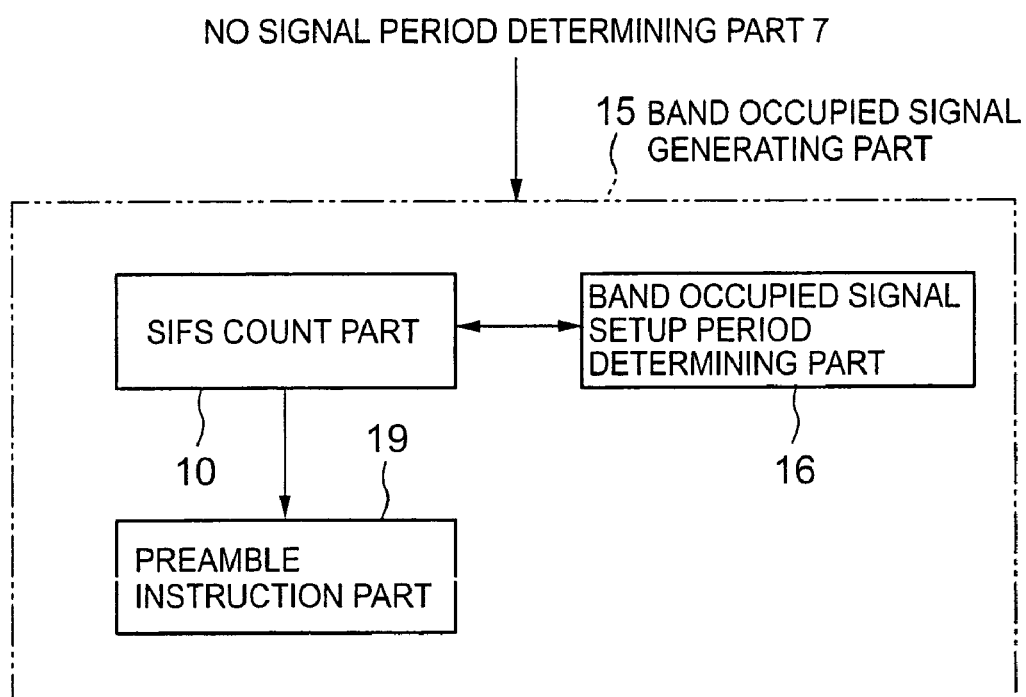
FIG. 16 is a block diagram showing a configuration of an access point in a wireless LAN system according to an eleventh embodiment of the present invention.
Figure 17:
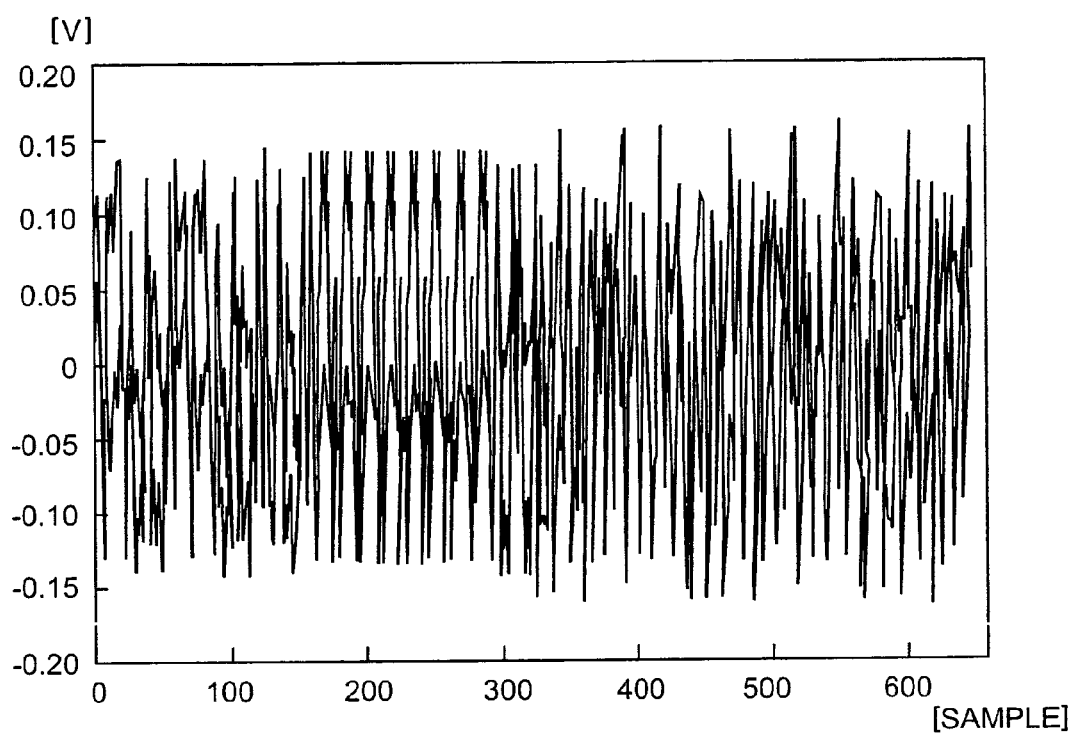
FIG. 17 is a waveform chart showing a band occupied signal obtained in the band occupied signal generating part in FIG. 16.
Figure 18:
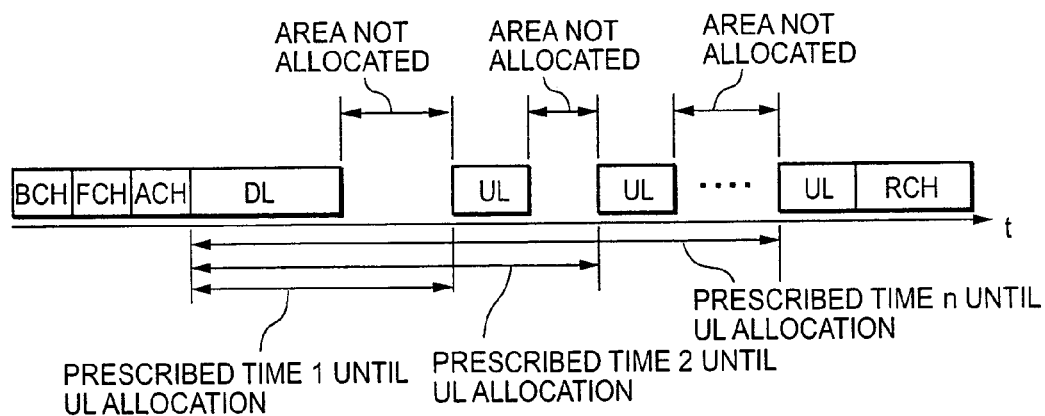
FIG. 18 is a diagram showing a communication frame generated at an access point in a conventional wireless LAN system.

As shown in the block diagram of FIG. 16, the band occupied signal generating part 15 in this embodiment has a preamble instruction part 19 that instructs the PHY part layer 3 through the data link part 1 and the medium access part 2 to transmit a preamble. FIG. 17 is a waveform chart showing a band occupied signal obtained in the band occupied signal generating part 15. The band occupied signal So shown in FIG. 17 is used as a preamble signal based on HiSWANa so that any mobile terminal belonging to the system can receive it. It allows the mobile terminal that has received the preamble signal to maintain more accurate synchronization. Frequency offset correction can also be made, which makes possible proper communication.

In the embodiment, the use of a preamble was mentioned. If a preamble unique for use in the band occupied signal is used, the preamble illustrated in the embodiment and another preamble used in another area can be used separately.

INDUSTRIAL APPLICABILITY

As described above and according to the present invention, even when a wireless LAN system initiating communication at fixed intervals and a wireless LAN system initiating communication after waiting for the vacancy of a channel exist together in each other's radio areas, since the collision of signals between them can be avoided, a system in which these wireless LAN systems are mixed can easily be built.

The invention claimed is:

1. A base station of a first wireless LAN system initiating communication at fixed intervals, the base station comprising:

a no-signal section determiner that determines whether there is a no signal section between a data block in a downlink phase for transmitting downlink data and a data block in an uplink phase allocated first to transmit uplink data, both of which are contained in frame data to be arranged upon scheduling of a communication frame of said first wireless LAN system; and a scheduler that, when said no-signal section determiner determines that there is a no signal section, schedules the transmission of a communication disable signal that prohibits communication in the no signal section by a second wireless LAN system, wherein said second wireless LAN system is arranged to initiate communication after waiting till a channel through which both of said first and second wireless LAN systems are able to perform in communication becomes vacant, wherein:

when the no signal section is longer than a gap time from the finish time of the downlink phase to the time of finishing detecting the vacancy of the channel by said second wireless LAN system, said scheduler transmits the communication disable signal at timing earlier than the finish time of the gap time.

2. A base station of a first wireless LAN system initiating communication at fixed intervals, the base station comprising:

a no-signal section determiner that determines whether there is a no signal section between data groups in uplink phases, which transmit uplink data belonging to different groups defined with different delay times, said data groups being contained in frame data to be arranged upon scheduling of a communication frame of said first wireless LAN system; and a scheduler that, when said no-signal section determiner determines that there is a no signal section, schedules the transmission of a communication disable signal that prohibits communication in the no signal section by a second wireless LAN system, wherein said second wireless LAN system is arranged to initiate communication after waiting till a channel through which both of said first and second wireless LAN systems are able to perform communication becomes vacant, wherein:

when the no signal section is longer than a gap time from the finish time of the data block allocated first between groups of data blocks in the uplink phases to the time of finishing detecting the vacancy of the channel by said second wireless LAN system, said scheduler transmits the communication disable signal at timing earlier than the finish time of the gap time.

3. A base station of a first wireless LAN system initiating communication at fixed intervals, the base station comprising:

a no-signal section determiner that determines whether there is a no signal section between a data block in a downlink phase for transmitting downlink data and a data block in an uplink phase allocated first to transmit uplink data, both of which are contained in frame data to be arranged upon scheduling of a communication frame of said first LAN system; and a scheduler that, when said no-signal section determiner determines that there is a no signal section, schedules the transmission of a channel in use signal indicating that the channel is in use to a second wireless LAN system which is arranged to initiate communication after waiting till the channel through which both of said first and second wireless LAN systems are able to perform communication becomes vacant, wherein:

when the no signal section is longer than a gap time from the finish time of the downlink phase to the time of finishing detecting the vacancy of the channel by said second wireless LAN system, said scheduler transmits the channel in use signal at timing earlier than the finish time of the gap time.

4. A base station of a first wireless LAN system initiating communication at fixed intervals, the base station comprising:
- a no-signal section determiner that determines whether there is a no signal section between data groups in uplink phases, which transmit uplink data belonging to different groups defined with different delay times, said data groups being contained in frame data to be arranged upon scheduling of a communication frame of said first wireless LAN system; and
- a scheduler that, when said no-signal section determiner determines that there is a no signal section, schedules the transmission of a channel in use signal indicating that the channel is in use to a second wireless LAN system which is arranged to initiate communication after waiting till the channel through which both of said first and second wireless LAN systems are able to perform communication becomes vacant, wherein:
- when the no signal section is longer than a gap time from the finish time of the data block allocated first between groups of data blocks in the uplink phases to the time of finishing detecting the vacancy of the channel by said second wireless LAN system, said scheduler transmits the channel in use signal at timing earlier than the finish time of the gap time.

5. The base station of said first wireless LAN system according to claim 4 wherein said scheduler transmits the channel in use signal repeatedly and intermittently at intervals not longer than the gap time during which said second wireless LAN system detects the vacancy of the channel, and for the duration of time enough to deter wine that the channel is in use when said second wireless LAN system detects the vacancy of the channel.

6. The base station of said first wireless LAN system according to claim 4 wherein said scheduler transmits a signal as the channel in use signal, which terminals belonging to said first wireless LAN system can usefully receive as a retransmission packet.

7. The base station of said first wireless LAN system according to claim 4 wherein said scheduler transmits a signal as the channel in use signal, which terminals belonging to the first wireless LAN system can usefully receive as a preamble signal.

8. A signal collision avoidance method for a first wireless LAN system initiating communication at fixed intervals, the method comprising:
- a step of determining whether a no signal section has occurred in a communication frame of said first wireless LAN system due to no data to be arranged between a data block in a downlink phase for transmitting downlink data and a data block in an uplink phase allocated first to transmit uplink data, both of which are contained in frame data to be arranged upon scheduling of the communication frame of said first wireless LAN system; and
- a step of providing a communication disable signal in the communication frame when it is determined that the no-signal section has occurred, said communication disable signal being used for prohibiting communication in the no signal section by a second wireless LAN system which is arranged to initiate communication after waiting until a channel through which both of said first and second wireless LAN systems are able to perform communication becomes vacant, wherein:
- when the no signal section is longer than a gap time from the finish time of the downlink phase to the time of finishing detecting the vacancy of the channel by said second wireless LAN system, the transmission of the communication disable signal is initiated at timing earlier than the finish time of the gap time.

9. A signal collision avoidance method for a first wireless LAN system initiating communication at fixed intervals, the method comprising:
- a step of determining whether a no signal section has occurred in a communication frame of said first wireless LAN system due to no data to be arranged between data groups in uplink phases, which transmit uplink data belonging to different groups defined with different delay times, said data groups being contained in frame data to be arranged upon scheduling of the communication frame of said first wireless LAN system; and
- a step of providing a communication disable signal in the communication frame when it is determined that the no-signal section has occurred in the communication frame of said first wireless LAN system, said communication disable signal being used for prohibiting communication in the no signal section by a second wireless LAN system, which is arranged to initiate communication after waiting until a channel through which both of said first and second wireless LAN systems are able to perform communication becomes vacant, wherein:
- when the no signal section is longer than a gap time from the finish time of the data block allocated first between groups of data blocks in the uplink phases to the time of finishing detecting the vacancy of the channel by said second wireless LAN system, the transmission of the communication disable signal is initiated at timing earlier than the finish time of the gap time.

10. A signal collision avoidance method for a first wireless LAN system initiating communication at fixed intervals, the method comprising:
- a step of determining whether a no signal section has occurred in a communication frame of said first wireless LAN system due to no data to be arranged between a data block in a downlink phase for transmitting downlink data and a data block in an uplink phase allocated first to transmit uplink data, both of which are contained in frame data to be arranged upon scheduling of the communication frame of said first wireless LAN system; and
- a step of providing a channel in use signal in a region corresponding to the no-signal section when it is determined that the no-signal section has occurred in the communication frame of said first wireless LAN system, to indicate to a second wireless LAN system that a channel is in use, said second wireless LAN system being arranged to initiate communication after waiting till the channel through which both of said first and second wireless LAN systems are able to perform communication becomes vacant, wherein:
- when the no signal section is longer than a gap time from the finish time of the downlink phase to the time of finishing detecting the vacancy of the channel by said second wireless LAN system, the transmission of the channel in use signal is initiated at timing earlier than the finish time of the gap time.

11. The signal collision avoidance method for the first wireless LAN system according to claim 10 wherein the channel in use signal is transmitted repeatedly and intermittently at intervals not longer than the gap time during which said second wireless LAN system detects the vacancy of the channel, and for the duration of time enough to determine that the channel is in use when said second wireless LAN system detects the vacancy of the channel.

12. The signal collision avoidance method for the first wireless LAN system according to claim 10 wherein the channel in use signal is a signal which terminals belonging to said first wireless LAN system can usefully receive as a retransmission packet.

13. The signal collision avoidance method for the first wireless LAN system according to claim 10 wherein the channel in use signal is a signal which terminals belonging to the first wireless LAN system can usefully receive as a preamble signal.

14. A signal collision avoidance method for a first wireless LAN system initiating communication at fixed intervals, the method comprising:
- a step of determining whether a no signal section has occurred in a communication frame of said first wireless LAN system due to no data to be arranged between data groups in uplink phases, which transmit uplink data belonging to different groups defined with different delay times, said data groups being contained in frame data to be arranged upon scheduling of the communication frame of said first wireless LAN system; and
- a step of providing a channel in use signal in an area corresponding to the no signal section when it is determined that the no-signal section has occurred in the communication frame of said first wireless LAN system, to indicate to a second wireless LAN system that a channel is in use, said second wireless LAN system being arranged to initiate communication after waiting till the channel through which both of said first and second wireless LAN systems are able to perform communication becomes vacant, wherein:
- when the no signal section is longer than a gap time from the finish time of the data block allocated first between groups of data blocks in the uplink phases to the time of finishing detecting the vacancy of the channel by said second wireless LAN system, the transmission of the channel in use signal is initiated at timing earlier than the finish time of the gap time.

15. The signal collision avoidance method for the first wireless LAN system according to claim 14 wherein the channel in use signal is transmitted repeatedly and intermittently at intervals not longer than the gap time during which said second wireless LAN system detects the vacancy of the channel, and for the duration of time enough to determine that the channel is in use when said second wireless LAN system detects the vacancy of the channel.

16. The signal collision avoidance method for the first wireless LAN system according to claim 14 wherein the channel in use signal is a signal which terminals belonging to said first wireless LAN system can usefully receive as a retransmission packet.

17. The signal collision avoidance method for the first wireless LAN system according to claim 14 wherein the channel in use signal is a signal which terminals belonging to the first wireless LAN system can usefully receive as a preamble signal.

18. A base station of a first wireless LAN system initiating communication at fixed intervals, the base station comprising:
- a first no-signal section determiner that determines whether a no signal section has occurred in a communication frame of said first wireless LAN system upon scheduling of the communication frame of said first wireless LAN system;
- a first scheduler that, when said no-signal section determiner determines that the no signal section has occurred in the communication frame of said first wireless LAN system, schedules the transmission of a communication disable signal that prohibits communication in the no signal section by a second wireless LAN system, wherein said second wireless LAN system is arranged to initiate communication after waiting till a channel through which both of said first and second wireless LAN systems are able to perform communication becomes vacant;
- a second no-signal section determiner that determines whether there is a no signal section between data groups which are contained in frame data to be arranged upon scheduling of a communication frame of said first wireless LAN system; and
- a second scheduler that, when said no-signal section determiner determines that there is a no signal section, schedules the transmission of a channel in use signal indicating that the channel is in use to said second wireless LAN system which is arranged to initiate communication after waiting till the channel through which both of said first and second wireless LAN systems are able to perform communication becomes vacant, wherein:
- when the no signal section is longer than a gap time from the finish time of the data block to the time of finishing detecting the vacancy of the channel by said second wireless LAN system, said second scheduler transmits the channel in use signal at timing earlier than the finish time of the gap time.

19. A signal collision avoidance method for a first wireless LAN system initiating communication at fixed intervals, the method comprising:
- a step of determining whether a no signal section has occurred in a communication frame upon scheduling of the communication frame;
- a step of providing a communication disable signal in the communication frame of said first wireless LAN system when it is determined that the no signal section has occurred in the communication frame of said first wireless LAN system, said communication disable signal being used for prohibiting communication in the no signal section by a second wireless LAN system which is arranged to initiate communication after waiting until a channel through which both of said first and second wireless LAN systems are able to perform communication becomes vacant;
- a step of determining whether a no signal section has occurred in a communication frame of said first wireless LAN system due to no data to be arranged between data groups which are contained in frame data to be arranged upon scheduling of the communication frame of said first wireless LAN system; and
- a step of providing a channel in use signal in an area corresponding to the no signal section when it is determined that the no-signal section has occurred in the communication frame of said first wireless LAN system, to indicate to a second wireless LAN system that a channel is in use, said second wireless LAN system being arranged to initiate communication after waiting till the channel through which both of said first and second wireless LAN systems are able to perform communication becomes vacant, wherein:
- when the no signal section is longer than a gap time from the finish time of the data block to the time of finishing detecting the vacancy of the channel by said second wireless LAN system, the transmission of the channel in use signal is initiated at timing earlier than the finish time of the gap time.

* * * * *